May 13, 1924.

R. G. KOBIDA

POWER TRANSMITTING ATTACHMENT FOR AUTOMOBILES

Filed May 18, 1922

1,494,255

INVENTOR.

Roy G. Kobida.

BY Joseph B. Gardner his ATTORNEY

Patented May 13, 1924.

1,494,255

UNITED STATES PATENT OFFICE.

ROY G. KOBIDA, OF OAKLAND, CALIFORNIA.

POWER-TRANSMITTING ATTACHMENT FOR AUTOMOBILES.

Application filed May 18, 1922. Serial No. 561,823.

*To all whom it may concern:*

Be it known that I, ROY G. KOBIDA, a citizen of the United States, and a resident of Oakland, county of Alameda, State of California, have invented a new and useful Power-Transmitting Attachment for Automobiles, of which the following is a specification.

My invention relates to an attachment for utilizing the motive power of an automobile for driving extraneous apparatus.

An object of the invention is to provide a device of the character described which may be attached to the automobile by removing but a minimum number of parts of the automobile, and removing only such parts as are originally intended for ready removal.

Another object of the invention is to provide an attachment of the character described which will enable the automobile and the apparatus adapted to be driven thereby to be held together as a unitary structure.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Figures 2, 3, 4:
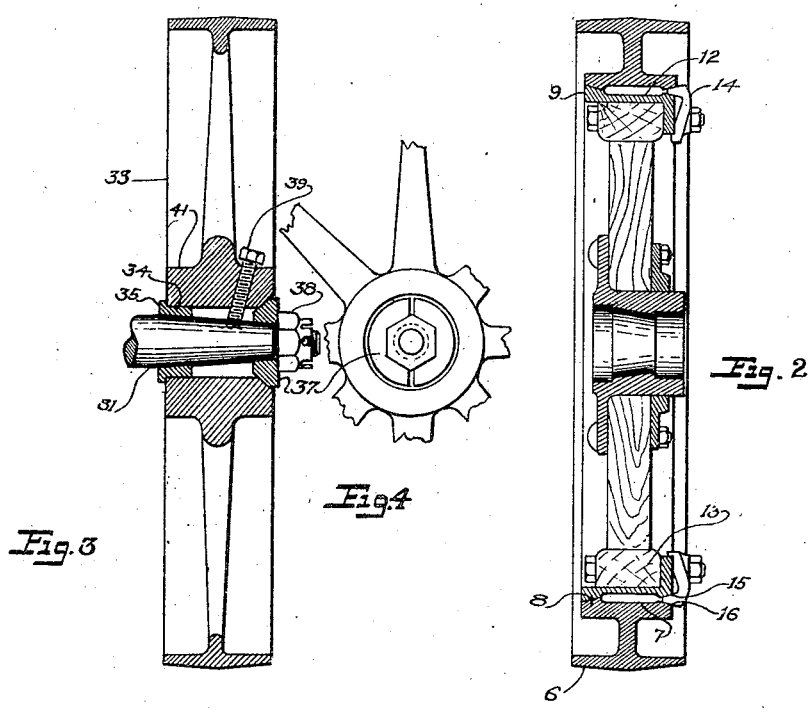
Figure 2 is a sectional view of an automobile wheel showing the driving member of the attachment arranged thereon.
Figure 3 is a sectional view similar to Figure 2 showing a modified construction of the driving member.
Figure 4 is a fragmentary side view of the axle and hub portion of the structure shown in Figure 3.
Figure 1:
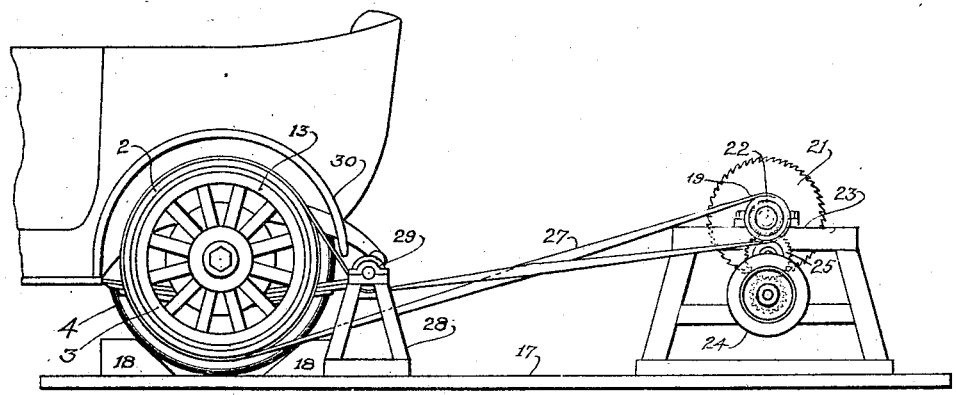
Figure 1 is a side view showing the attachment operatively connected to an automobile.

Briefly expressed the invention in its preferred embodiment comprises a pulley rim which is adapted to be substituted on one of the drive wheels of the automobile for the tire and demountable rim. The pulley is arranged to be connected by a belt to a driven pulley which is associated with the apparatus that is to be driven by the motive power of the automobile. The driven pulley and said apparatus are mounted on a support, and the automobile is arranged to be firmly anchored to this support, so that virtually a unitary structural effect is produced.

A detailed description follows:

The driving member 2 of my attachment is arranged in its preferred form to be placed on one of the drive wheels 3 and 4 of the automobile, and comprises a pulley rim 6 whose inner face 7 is formed similar to the inner face of the usual demountable tire-rim so that when said tire-rim is removed the pulley-rim 6 may be substituted therefor. As illustrated in the drawings, the inner face 7 of the pulley rim is provided with a conical section 8 which is adapted to fit against the correspondingly shaped section 9 of the outer face 12 of the wheel rim 13. The section 8 of the pulley is held firmly against the wheel section by the same clamps 14 which function to hold the demountable tire-rim on the wheel. By referring to Figure 2 of the drawings it will be seen that the clamps are removably attached to the wheel and are adapted to wedge in between the opposing beveled faces 15 and 16 of the pulley and wheel rim respectively, so that the said rims are rigidly held together.

When the pulley-rim is being placed on or removed from the wheel 3 and during the time said rim is in use, the wheel 4 is positioned on a bed plate 17 and locked between the chuck blocks 18, and in the present embodiment of the invention the driven pulley 19 and apparatus 21 are securely positioned on said plate. In this manner the automobile and driven apparatus will be practically held together as if combined in a single structural unit, with the result that the relative shifting of the automobile and driven apparatus will be reduced to a minimum while the mechanism is operating. The driven pulley and driven apparatus, the latter being in the present instance a circular saw, are fixed on a shaft 22 which is mounted in the bearing frame member 23 fixed on the bed plate 17. In order to steady the saw during the rotation thereof, a flywheel 24 is preferably mounted in the member 23 and is connected to the shaft 22 by suitable gearing 25.

The drive and driven pulleys are connected by a belt 27 which is preferably crossed so that an operator may cut with the edge of the saw nearer the outer end of the apparatus.

Mounted in the bearing member 28 which is fixed to the plate, is an idler pulley 29 one of whose functions is to hold the belt 27 depressed below the rear extremity of the fender 30. In this manner the attachment of my invention may be connected to the automobile and operated without the necessity of removing any of the automobile fenders.

In Figures 3 and 4, I have shown a slight modification of the driving member. In this form of the invention said drive member is formed as a complete pulley 33 rather than only the rim as shown in Figure 2. In attaching the pulley, the wheel 3 is adapted to be entirely removed from the automobile axle 30, and the pulley is then slipped over said axle and a sleeve 34 which is removably fitted on the axle. The wheel is then backed against a shoulder 35 of the sleeve and held firmly against the same by means of the split wedge-washer 37 and nut 38. A set-screw 39 which extends through the pulley hub 41 and engages in the axle serves to prevent relative rotation of the axle and pulley.

I claim:

1. The combination in a power-transmitting attachment for automobiles having wheels with a demountable tire-engaging rim member, of a drive pulley adapted to be substituted on one of said wheels for the rim member, a support on which one of the automobile wheels is arranged to be anchored, a driven pulley mounted on said support, and connections between said pulleys.

2. The combination in a power transmitting attachment for automobiles, of a pulley arranged to be removably held on the driving axle of the automobile, a support on which one of the driving wheels of the automobile is adapted to be anchored, a driven pulley spaced from said axle and mounted on said support, a belt connecting said pulleys, and an idler pulley mounted on said support adapted to engage said belt whereby it may travel under the automobile fender abjacent said drive pulley.

In testimony whereof, I have hereunto set my hand at Oakland, this 24 day of April 1922.

ROY G. KOBIDA.